(12) United States Patent
Munoz et al.

(10) Patent No.: US 6,866,175 B2
(45) Date of Patent: Mar. 15, 2005

(54) BICYCLE CARRIER ADAPTED TO BE USED ON A VERTICALLY ORIENTATED VEHICLE ARTICLE CARRIER

(75) Inventors: Donald L. Munoz, Bloomfield Hills, MI (US); David J. Spolyar, Lake Orion, MI (US); Gerard J. Kmita, Allen Park, MI (US); Brian E. Henderson, Fraser, MI (US); Dan Svenningsson, Ulricehamn (SE); Claude K. Trambley, Sterling Heights, MI (US); Brett J. Borella, Bloomfield Hills, MI (US); Conde M. Gonzalez, Utica, MI (US)

(73) Assignee: JAC Products Inc., Saline, MI (US)

( * ) Notice: Subject to any disclaimer, the term of this patent is extended or adjusted under 35 U.S.C. 154(b) by 11 days.

(21) Appl. No.: 10/287,425

(22) Filed: Nov. 4, 2002

(65) Prior Publication Data

US 2003/0089751 A1 May 15, 2003

Related U.S. Application Data

(63) Continuation-in-part of application No. 10/047,937, filed on Oct. 29, 2001, now abandoned.

(51) Int. Cl.[7] .............................................. B60R 9/048
(52) U.S. Cl. ...................... 224/324; 492/501; 492/513; 492/904
(58) Field of Search ................................ 224/324, 492, 224/501, 513, 924

(56) References Cited

U.S. PATENT DOCUMENTS

| | | | | |
|---|---|---|---|---|
| 4,452,384 A | * | 6/1984 | Graber ......................... | 224/314 |
| 4,702,401 A | * | 10/1987 | Graber et al. ............... | 224/536 |
| 5,690,259 A | * | 11/1997 | Montani ...................... | 224/310 |
| 5,709,521 A | * | 1/1998 | Glass et al. ................. | 414/462 |
| 5,762,248 A | * | 6/1998 | Englander et al. .......... | 224/324 |
| 5,820,002 A | * | 10/1998 | Allen ........................... | 224/324 |
| 5,862,966 A | * | 1/1999 | Mehls .......................... | 224/504 |
| 5,988,403 A | * | 11/1999 | Robideau ..................... | 211/20 |
| 5,996,870 A | * | 12/1999 | Shaver ......................... | 224/532 |
| 6,019,266 A | | 2/2000 | Johnson | |
| 6,338,427 B1 | * | 1/2002 | Aftanas et al. .............. | 224/310 |
| 6,460,743 B2 | * | 10/2002 | Edgerly et al. .............. | 224/324 |
| 6,491,195 B1 | | 12/2002 | McLemore et al. | |
| 6,516,984 B1 | * | 2/2003 | Kmita et al. ................. | 224/310 |

FOREIGN PATENT DOCUMENTS

| | | |
|---|---|---|
| DE | 42 14 567 A1 | 5/1992 |
| DE | 42 26 945 A1 | 2/1994 |
| DE | 43 30 045 A1 | 3/1995 |
| FR | 2 734 528 A1 | 5/1996 |
| GB | 2 273 273 A | 6/1994 |
| JP | 9-52560 | 2/1997 |
| WO | WO 00/05097 | 2/2000 |

OTHER PUBLICATIONS

Search report issued Dec. 24, 2003 for corresponding British Application No. GB 0323482.0.

* cited by examiner

*Primary Examiner*—Stephen K. Cronin
(74) *Attorney, Agent, or Firm*—Harness, Dickey & Pierce P.L.C.

(57) ABSTRACT

A bicycle carrier adapted to be secured to an article carrier portion of an existing vehicle article carrier so as to carry the bicycle supported thereon in a vertical orientation over a liftgate of a vehicle, and normal to an outer surface of the liftgate. The bicycle carrier includes a wheel supporting member for engaging one wheel of a bicycle when the bicycle is placed in a vertical orientation. A frame supporting assembly engages a portion of the frame to hold the bicycle to the bicycle carrier. The bicycle carrier permits a single individual to load and unload a bicycle from the bicycle carrier without being required to lift the bicycle up onto the roof of a vehicle. Since the bicycle is supported at an angle generally normal to the liftgate, visibility through the rear window of the liftgate is also improved when a bicycle is being supported on the bicycle carrier.

33 Claims, 14 Drawing Sheets

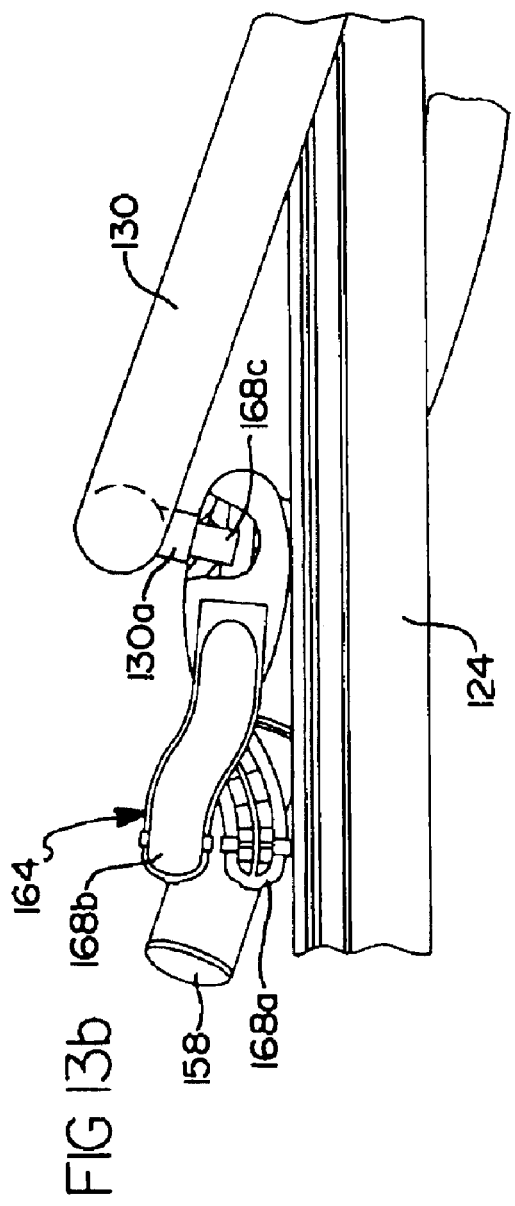
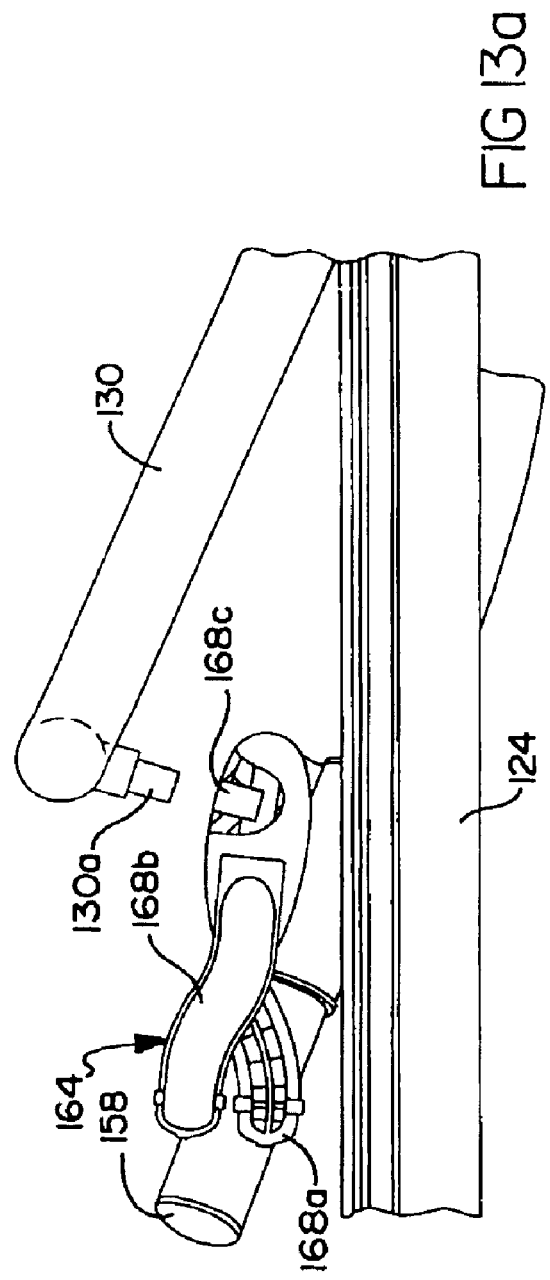
FIG 13b
FIG 13a

BICYCLE CARRIER ADAPTED TO BE USED ON A VERTICALLY ORIENTATED VEHICLE ARTICLE CARRIER

CROSS-REFERENCE TO RELATED APPLICATIONS

This application is a continuation-in-part of U.S. patent application Ser. No. 10/047,937 filed on Oct. 29, 2001, now abandoned.

FIELD OF THE INVENTION

This invention relates to bicycle carriers, and more particularly to a bicycle carrier adapted to support a bicycle thereon in a vertical orientation adjacent to a liftgate of the vehicle.

BACKGROUND OF THE INVENTION

A wide variety of bicycle carriers have been developed for transporting bicycles on exterior surfaces of a motor vehicle. Frequently, such bicycle carriers are secured to an existing vehicle article carrier component, such as one or more cross bars of an existing vehicle article carrier supported over a roof portion of the vehicle. This requires the user to lift the bicycle up onto the roof of the vehicle and then to secure it to the bicycle carrier. As will be appreciated, this typically requires some form of step stool or ladder, in addition to a fair degree of physical strength to hoist the bicycle overhead onto the roof of the vehicle. Often, two individuals are required to perform this step. Removing the bicycle requires the same steps but in a reverse order.

Present day vehicles such as sport utility vehicles and minivans now can be used with a vehicle article carrier having an article supporting portion which can be positioned over the liftgate of the vehicle. It would be highly desirable to provide a bicycle carrier that is adapted to be secured to this article carrying portion of an existing vehicle article carrier such that a bicycle could be loaded onto the bicycle carrier without the user being required to lift the bicycle up onto the roof of the vehicle. Allowing the bicycle to be loaded onto the bicycle carrier while the user is standing on the ground would significantly ease the loading and unloading of the bicycle from the bicycle carrier. Furthermore, in many instances it would enable a single person to load and unload a bicycle from the bicycle carrier.

Accordingly, it is a principal object of the present invention to provide a bicycle carrier specifically adapted for use with existing vehicle article carriers which include an article carrying portion disposed over a liftgate of the vehicle. More specifically it is a principal object to provide a bicycle article carrier adapted to be used with such an existing vehicle article carrier as described above, and wherein the bicycle can be rested in a vertical orientation on a portion of the bicycle carrier by one person, while the same person secures the frame of the bicycle to the bicycle carrier. Such a bicycle carrier would significantly improve the ease with which a single person can load and unload a bicycle from the bicycle carrier.

It is a further object of the present invention to provide a bicycle carrier as described immediately above in which the components which engage and support the bicycle can be folded into a compact arrangement when the bicycle carrier is not in use.

It is still a further object of the present invention to provide a bicycle carrier, as described above, which does not interfere with operation of the liftgate when no bicycle is being supported on the bicycle carrier.

SUMMARY OF THE INVENTION

The present invention is directed to a bicycle carrier that is particularly adapted to be used with an existing vehicle article carrier which has an article carrying portion disposed over a liftgate of the vehicle. The bicycle carrier is adapted to be secured to existing structure of the vehicle article carrier, such as one or more cross bars thereof, such that the bicycle carrier extends in a generally vertical orientation over the liftgate of the vehicle.

In one preferred form, the bicycle carrier includes an elongated support rail forming a channel. At the lower end thereof, a foldable support member is secured to the support rail. The foldable support member can be folded out into an operative position and used to engage a wheel of the bicycle when the bicycle is lifted up and placed thereon and against the elongated support rail.

In this embodiment, the foldable support member comprises a generally U-shaped component that is pivotally secured to the lower end of the support rail. When folded up into its inoperative position, the supporting member extends generally parallel to the elongated support rail. However, when folded into its operative position, it extends generally perpendicularly from the elongated support rail and supports substantially the entire weight of a bicycle placed thereon.

A frame supporting assembly includes a frame supporting member operably secured to the elongated support rail and movable pivotally relative to the elongated support rail. A clamp assembly is carried on the frame supporting member for clampingly engaging a portion of the frame of a bicycle positioned on the bicycle carrier. The frame supporting assembly helps to hold the bicycle stationary against the elongated support rail and on the foldable wheel support component while the bicycle is being transported on the vehicle.

In an alternative preferred embodiment, the foldable support member is secured to the frame supporting assembly at the upper end of the channel. When folded out into an operative position, the foldable support member may be used to engage a wheel of the bicycle. Specifically, when the bicycle is lifted up and placed upon the support member and against the elongated support rail, the bicycle freely hangs from the foldable support member without requiring any additional support, thus freeing both hands of the operator to apply the clamp assembly to the bicycle.

It is a principal advantage of the bicycle carrier of the present invention that a single individual can lift a bicycle up onto the foldable wheel supporting component and then, with one hand, affix the frame supporting assembly to a portion of the frame. Accordingly, there is no need to attempt to lift the bicycle up over a roof portion of the vehicle. The bicycle carrier of the present invention thus provides a means for transporting a bicycle in a vertical orientation adjacent to a liftgate of the vehicle and significantly adds to the convenience in loading and unloading of the bicycle from the bicycle carrier.

BRIEF DESCRIPTION OF THE DRAWINGS

The present invention will become more fully understood from the detailed description and the accompanying drawings, wherein:

FIG. 13a is a partial side view of a wheel supporting member of the bicycle carrier of FIG. 9 positioned directly above a clamp assembly of the bicycle carrier of FIG. 9, with a locking post of the wheel supporting member aligned above a flange of the clamp assembly;

FIG. 13b is a partial side view of the wheel supporting member seated upon the clamp assembly with the locking post of the wheel supporting member seated within the flange of the clamp assembly.

DETAILED DESCRIPTION OF THE PREFERRED EMBODIMENTS

The following description of the preferred embodiments is merely exemplary in nature and is in no way intended to limit the invention, its application, or uses.

Figure 1:
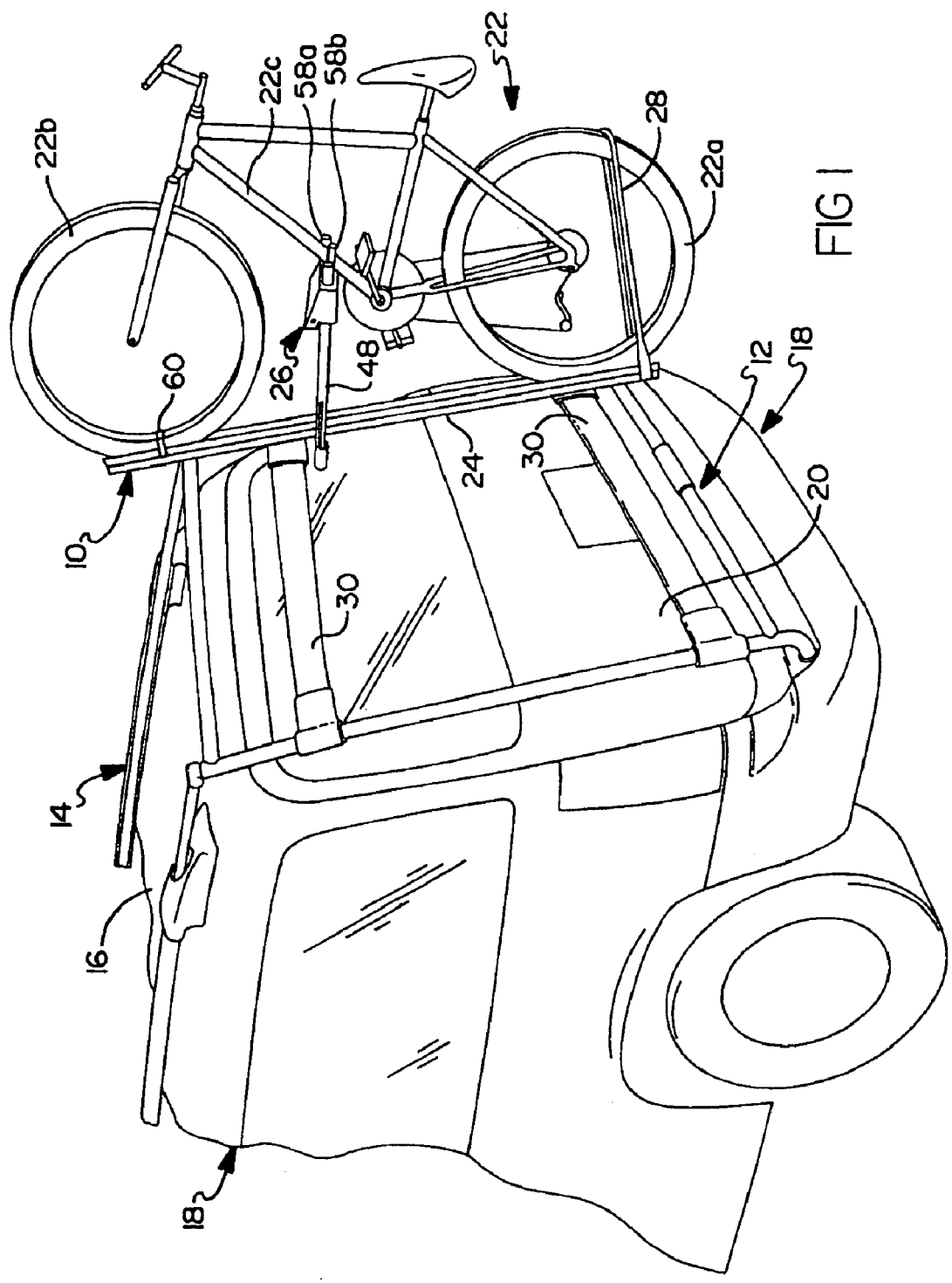
FIG. 1 is a perspective view of a portion of a vehicle having a rear liftgate, with a bicycle carrier in accordance with one preferred embodiment of the present invention secured to an article supporting portion of an existing vehicle article carrier secured to the vehicle, and further showing a bicycle being supported on the bicycle carrier.

Referring to FIG. 1, there is shown a bicycle carrier 10 in accordance with one of the preferred embodiments of the present invention. The bicycle carrier 10 is adapted to be secured to an article-supporting portion 12 of an existing vehicle article carrier 14. The vehicle article carrier 14 is secured to an outer body surface 16 of a motor vehicle 18 such that the article supporting portion 12 extends over a liftgate 20 of the vehicle 18. Such an existing vehicle article carrier is disclosed in co-pending U.S. application Ser. No. 09/698,761, the disclosure of which is hereby incorporated by reference.

It is a principal advantage of the present invention that the bicycle carrier 10 allows a bicycle 22 to be supported in a vertical orientation over, but spaced apart from, the liftgate 20 of the vehicle 18. Accordingly, loading and unloading of the bicycle 22 from the bicycle carrier 10 does not require a user to lift the bicycle 22 onto the roof area of the vehicle 18. This allows an individual to easily load the bicycle 22 onto the bicycle carrier 10 without the assistance of a second individual.

Figure 2:
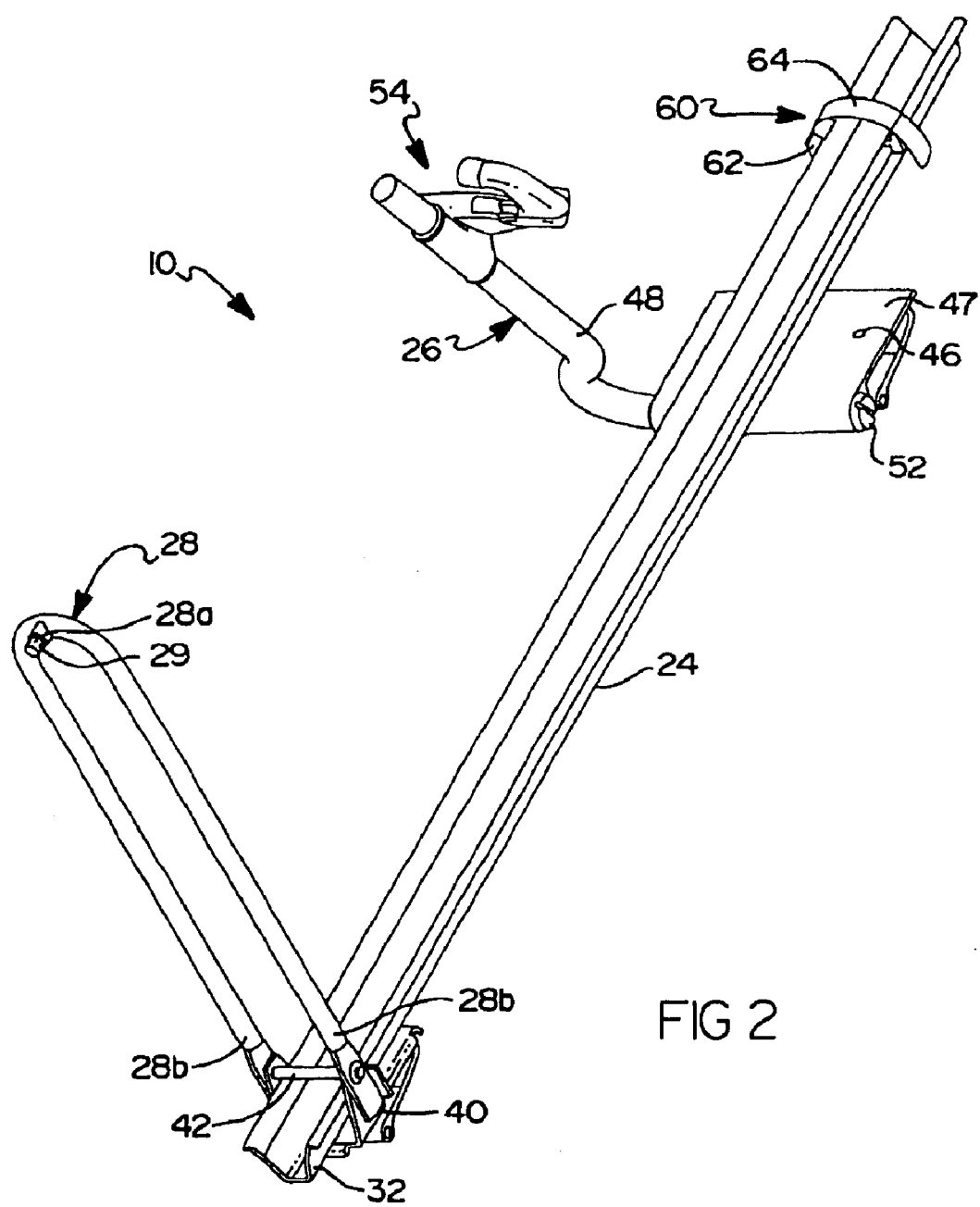
FIG. 2 is a perspective view of the bicycle carrier of FIG. 1 detached from the article supporting portion of the vehicle article carrier of FIG. 1.

Referring further to FIGS. 1 and 2, the bicycle carrier 10 generally includes an elongated support rail 24, a frame engaging assembly 26 and a wheel supporting member 28. The wheel supporting member 28 includes a locking post 28a for securing the member 28 in a folded (non-use) position. This feature will be described in greater detail in the following paragraphs.

The elongated support rail 24 is secured to preferably a pair of cross bars 30 of the article supporting portion 12 of the article carrier 14 by clamps or any other suitable means. While two such cross bars 30 are illustrated, it will be appreciated that a lower end 32 of the elongated support rail 24 may just as readily be secured to a bumper 34 of the vehicle 18 if only one cross bar 30 is present. With brief reference to FIG. 3, the elongated support rail 24 includes a plurality of openings 36 formed in a bottom wall 38 thereof for facilitating attachment of the support rail 24 to the cross bars 30.

Figure 3:
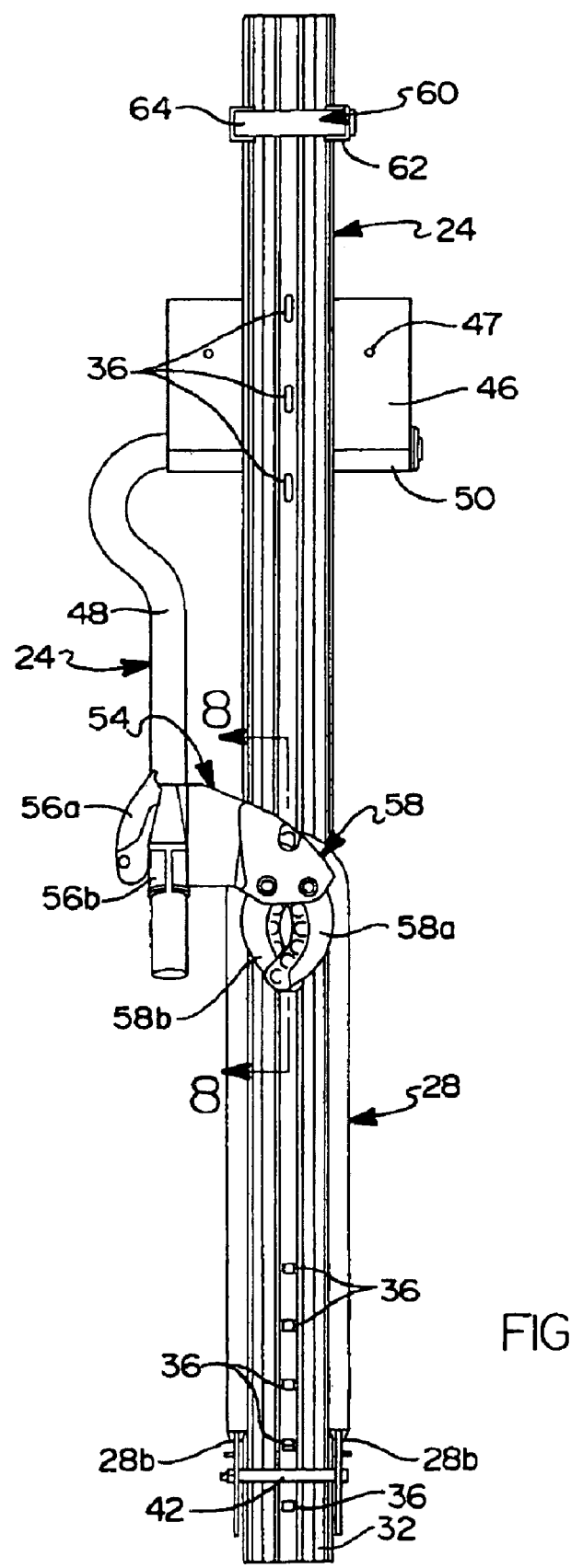
FIG. 3 is a plan view of the bicycle carrier of FIG. 2.
Figure 4:
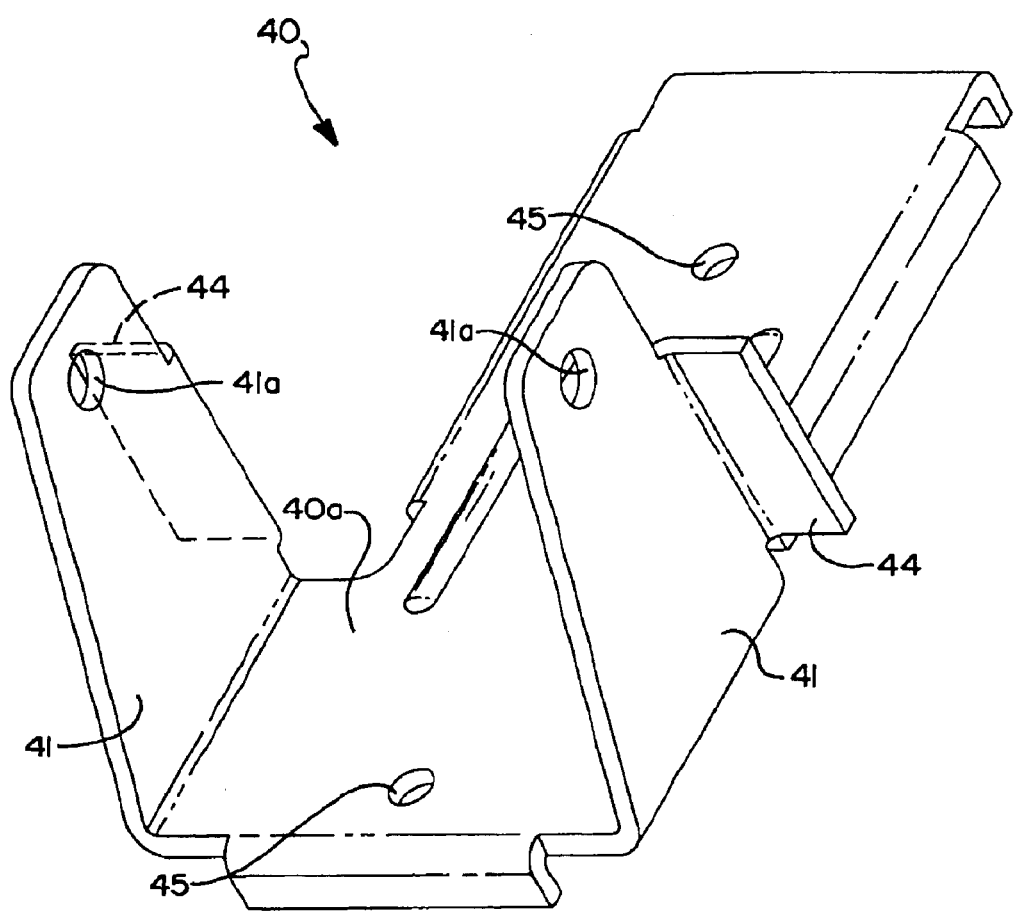
FIG. 4 is a perspective view of the support bracket for securing the foldable wheel supporting member pivotally to the elongated support rail of the bicycle carrier of FIG. 1.

With further reference to FIGS. 2–4, the wheel supporting member 28 forms a generally U-shaped component having a pair of lower ends 28b. The lower ends 28b are secured to flanges 41 of a support bracket 40 via a pivot pin 42. The pivot pin 42 extends through openings 41a in each of the flanges. This support bracket 40 is also shown in FIG. 4 and comprises a generally U-shaped member having a base 40a and stop portions 44 which limit pivotal movement of the wheel supporting member 28 to a position preferably extending generally normal to the elongated support rail 24. The support bracket 40 is secured to the elongated support rail 28 by threaded fasteners or any other suitable means extending through openings 45 in the base 40a and one or more of the openings 36 adjacent the lower end 32 of the elongated support rail 24.

Figure 5:
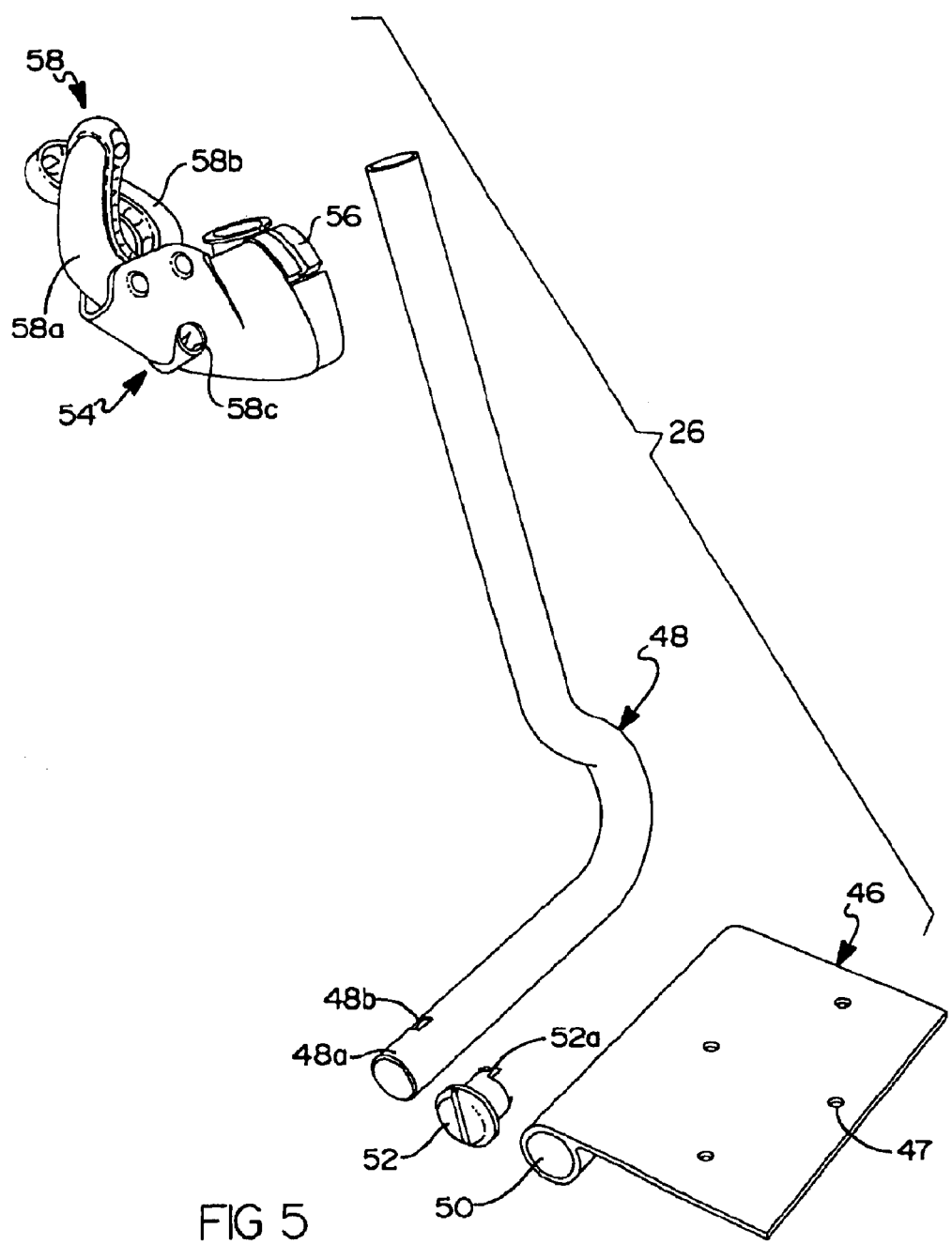
FIG. 5 is an exploded perspective view of a frame engaging assembly of the bicycle carrier of FIG. 1.

With further reference to FIGS. 2, 3 and 5, the frame supporting assembly 26 can be seen in greater detail. Frame supporting assembly 26 includes a plate 46 that is secured to the elongated support rail 24 via suitable fasteners extending through openings 47 in the plate and the openings 36 in the support rail. A tubular frame supporting element 48 is pivotally supported from the plate 46 such that the element 48 can be lifted into a position extending outwardly of the support rail 24 or folded down into a position generally parallel to the support rail 24. This is facilitated by a lower end 48a of the frame supporting element 48 being disposed within a sleeve 50 of the plate 46.

Referring further to FIGS. 2 and 5, the frame supporting assembly 26 includes an end cap 52 adapted to be inserted into the lower end 48a of the frame supporting element 48 after the lower end is inserted into the tubular sleeve 50 of the plate 46. End cap 52 includes a pair of flexible arm portions 52a (only one being visible) which engage with openings 48b in the lower end portion 48a to thus prevent the end cap 52 from being pulled out of the sleeve 50 once assembled thereto.

Figure 6:
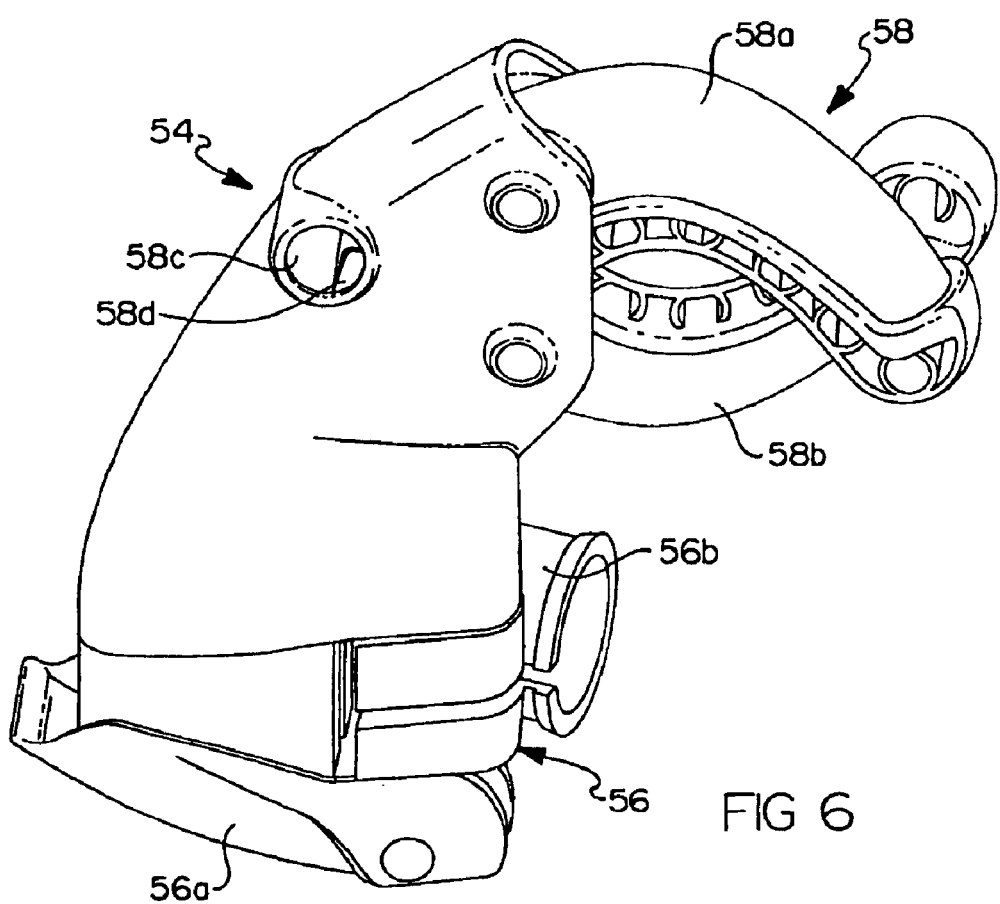
FIG. 6 is a perspective view of a clamp assembly carried by the frame engaging assembly.
Figure 7:
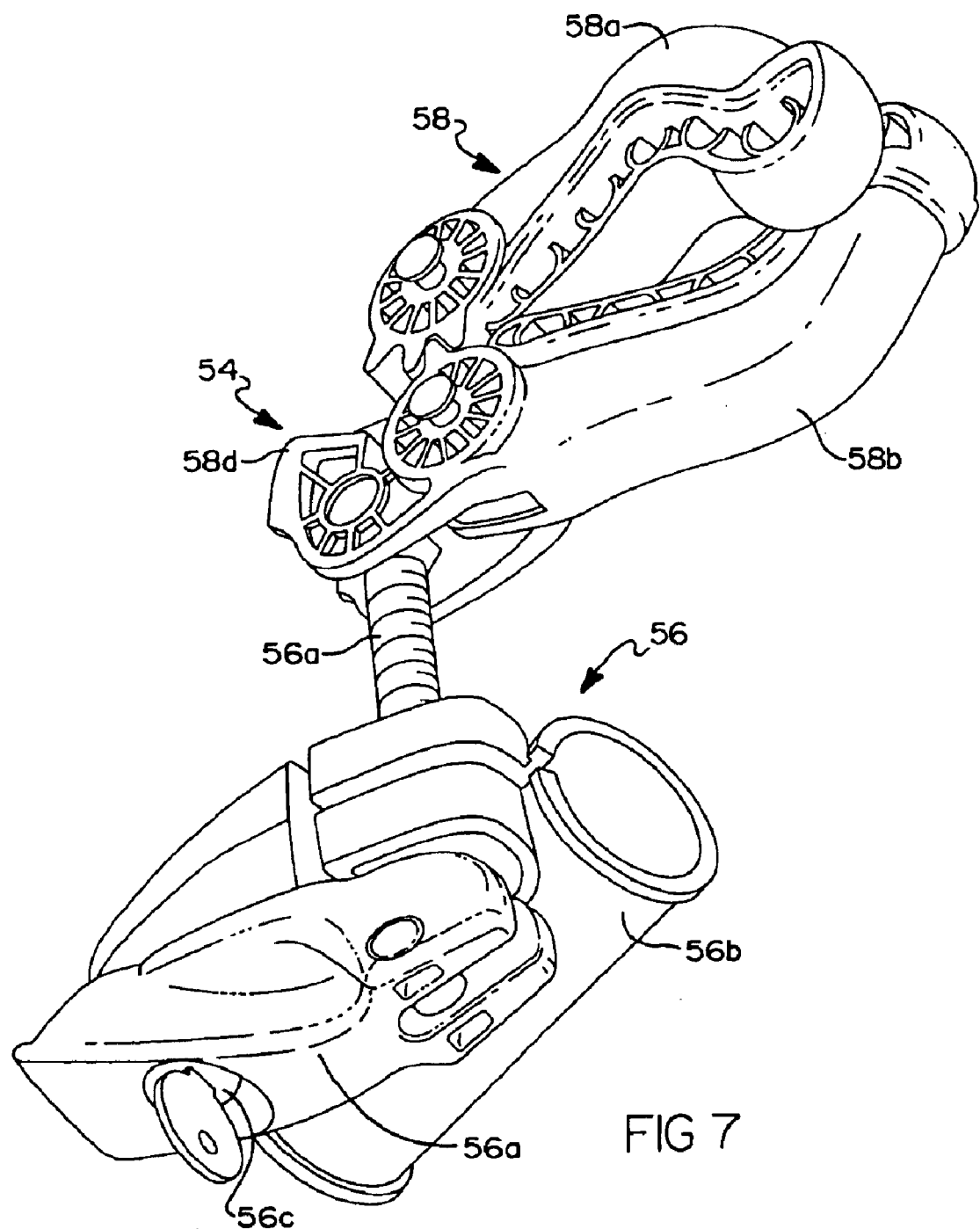
FIG. 7 is a rear perspective view of the clamp assembly of FIG. 6.

FIGS. 5, 6 and 7 also illustrate a clamp assembly 54 carried by the frame supporting element 48. The clamp assembly 54 engages a frame portion 22c of the bicycle 22 to help maintain the bicycle in a vertical orientation and against the elongated support rail 24. The clamp assembly 54 is commercially available from Mont Blanc Industri AB, of Toarpsdal, Sweden. The clamping assembly 54 includes a first clamping subassembly 56 that can be used to adjustably position the clamping assembly 54 along the frame supporting element 48. This first clamping subassembly 56 is coupled to a second clamping assembly 58. The second clamping assembly 58 includes a pair of jaws 58a and 58b adapted to engage the frame portion 22c of the bicycle 22. The jaws 58a and 58b are opened and closed by a locking lever 56a. Tightening of the locking lever 56a not only causes the jaws 58a and 58b to be drawn tight around the frame 22c, but also tightens a split collar 56b on the tubular frame supporting element 48. A lock 56c (FIG. 7) prevents the locking lever 56a from being rotated. The ability to adjustably position the clamp assembly 54 thus allows bicycles of varying frame sizes to be accommodated on the bicycle carrier 10.

Figure 8:
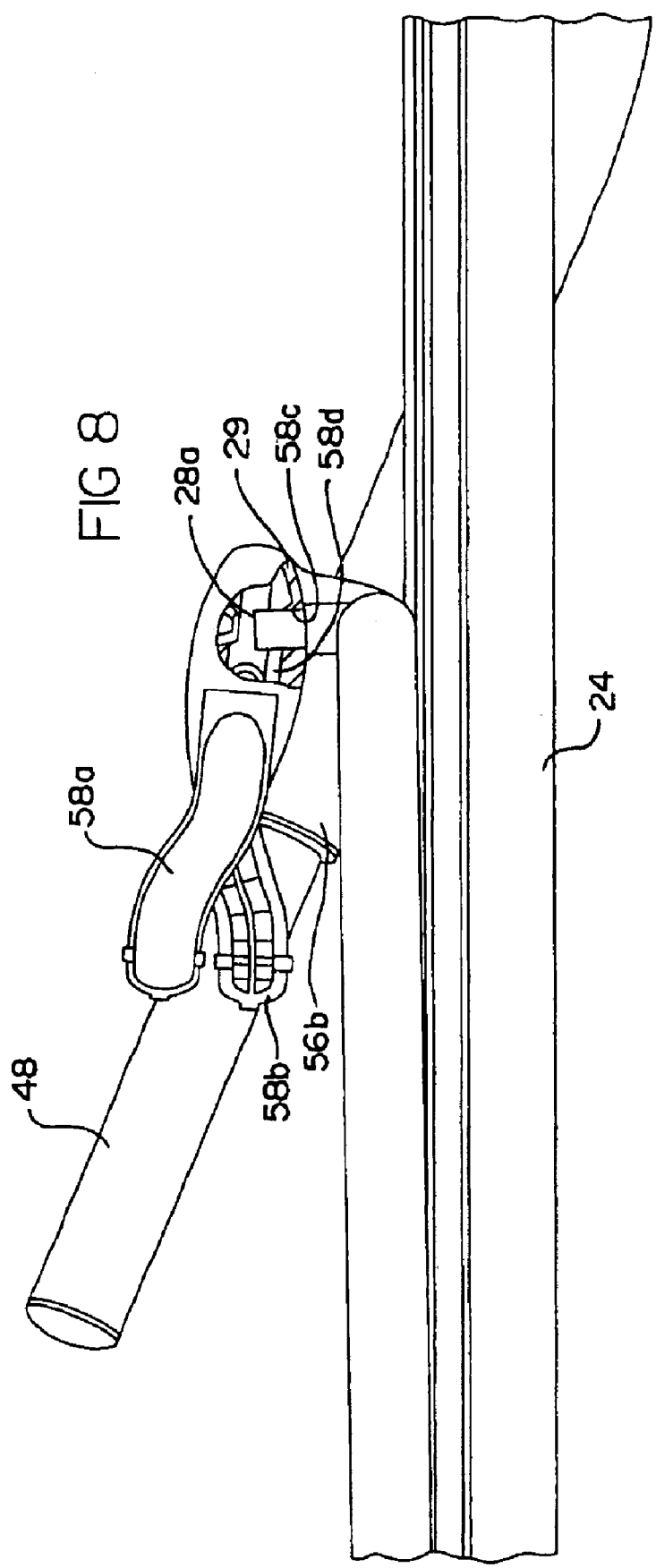
FIG. 8 is a partial side cross sectional view of the wheel supporting member secured to the clamp assembly, in accordance with section line 8—8 in FIG. 3.

The second clamping assembly 58 also includes a recess 58c that receives the locking post 28a when the wheel supporting member 28 is in its folded orientation shown in FIG. 3. With specific reference to FIGS. 6, 7 and 8, one of the jaws 58b has a flange 58d that engages with a notch 29 of the locking post 28a when the jaws 58a and 58b are fully closed and the locking post is present within the recess 58c. In this manner the wheel supporting member 28 and the frame engaging assembly 26 can be secured to one another and held in the orientation shown in FIG. 3 when the bicycle carrier 10 is not in use.

For holding the bicycle carrier 10 to one or both of the cross bars 30, a clamp such as disclosed in U.S. application Ser. No. 09/865,237, filed May 25, 2001, incorporated by reference herein, may be used to allow the elongated support rail 24 to be secured to one or both of the cross bars 30. However, it will be appreciated that any other suitable intermediate structure capable of being attached to the cross bars and capable of being secured via suitable external fastening elements to the elongated support rail 24 may be employed. Still further, it is anticipated that the bicycle carrier 10 of the present invention could be supported entirely from the bumper, or possibly even from a hitch assembly secured to a frame portion of the vehicle 18 via a suitable intermediate component which engages the hitch and also provides a point of attachment to the elongated support rail 24.

FIG. 3 illustrates the bicycle carrier 10 with the wheel supporting member 28 and the frame supporting element 48 folded generally parallel to the elongated support rail 24. It will be appreciated when the frame supporting element 48 and the wheel supporting member 28 are in these positions, bicycle carrier 10 forms a compact assembly which can be easily maintained on a vehicle.

Referring further to FIGS. 2 and 3, a strap 60 is preferably also included for allowing the rear wheel of the bicycle 22 to be secured positively to the elongated support rail 24. The strap 60 includes a conventional locking assembly 62 for allowing a strap portion 64 thereof to be adjustably tightened over the wheel. Alternatively, a simple nylon or length of flexible yet strong strapping may be disposed through a pair of slots formed in the elongated support rail 24 and held with a hook and loop style fastener such as Velcro®, or any other form of suitable fastening means.

Referring further to FIG. 1, in operation the user lifts the bicycle 22 up into the orientation shown in FIG. 1 and places a rear wheel 22a thereof in the wheel supporting member 28. The user then orientates the bicycle 22 so that the front wheel 22b is placed within the elongated support rail 24. With one hand, the user then lifts up the frame supporting element 48 of the frame supporting assembly 26 and secures the clamping jaws 58a and 58b of clamp 58 over frame tube 22c of the bicycle 22. The clamp assembly 54 can then be tightened on the frame supporting element 48. Lastly, the strap 60 can be tightened over the rear wheel 22a.

Figure 9:
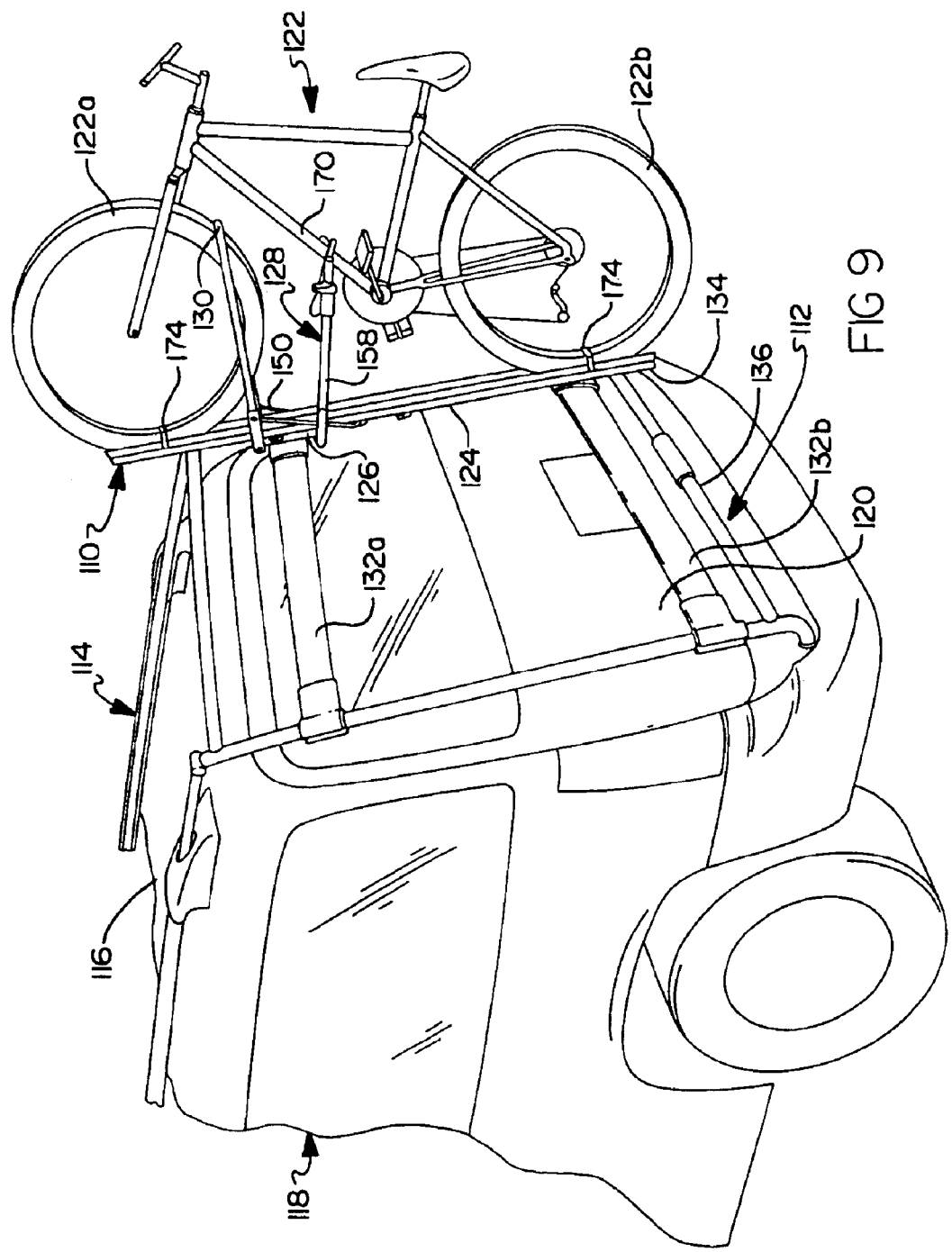
FIG. 9 is a perspective view of a portion of a vehicle having a rear liftgate, with a bicycle carrier in accordance with a second preferred embodiment of the present invention secured to an article supporting portion of an existing vehicle article carrier to the vehicle, and further showing a bicycle being supported on the bicycle carrier.

Referring to FIG. 9, there is shown a bicycle carrier 110 in accordance with an additional preferred embodiment of the present invention. Similar to bicycle carrier 10, the bicycle carrier 110 is adapted to be secured to an article-supporting portion 112 of an existing vehicle article carrier 114. The vehicle article carrier 114 is secured to an outer body surface 116 of a motor vehicle 118, such that the article supporting portion 112 extends over a liftgate 120 of the vehicle 118. Such an existing vehicle article carrier is disclosed in copending U.S. application Ser. No. 09/698,761, the disclosure of which is hereby incorporated by reference.

Like bicycle carrier 10, bicycle carrier 110 allows a bicycle 122 to be supported in a vertical orientation over, but spaced apart from, the liftgate 120 of the vehicle 118. Accordingly, loading and unloading of the bicycle 122 from the bicycle carrier 110 does not require a user to lift the bicycle 122 onto the roof area of the vehicle 118. This allows an individual to easily load the bicycle 122 onto the bicycle carrier 110 without the assistance of a second individual.

Figure 10:
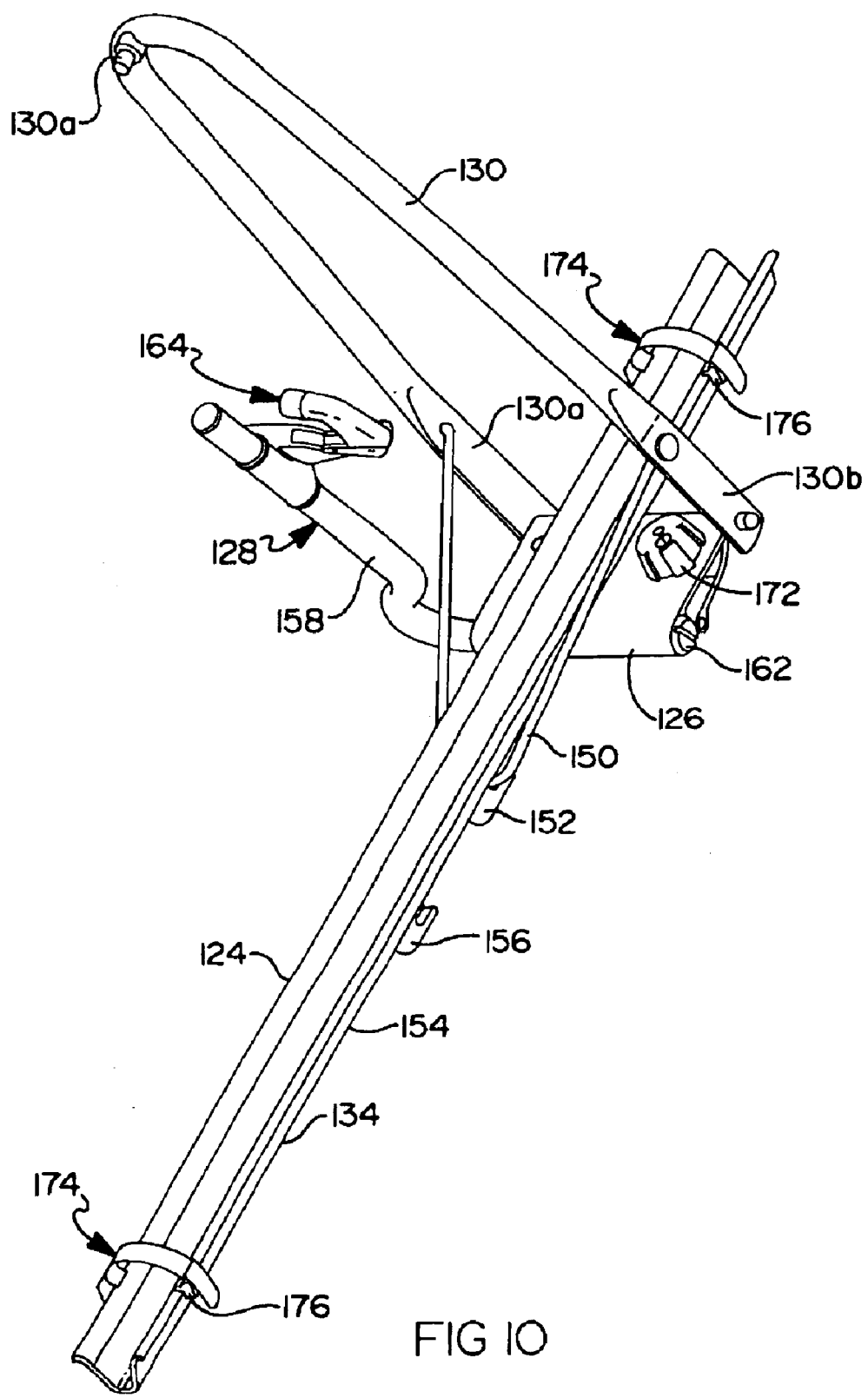
FIG. 10 is a perspective view of the bicycle carrier of FIG. 9 detached from the article supporting portion of the vehicle article carrier of FIG. 1.

Referring further to FIGS. 9 and 10, the bicycle carrier 110 generally includes an elongated support rail 124 having an attached plate 126. Secured to the plate 126 is a frame engaging assembly 128 and a wheel supporting member 130. The wheel supporting member 130 includes a locking post 130a for securing the wheel supporting member 130 in a folded (non-use) position. This feature is described in greater detail in the following paragraphs.

The elongated support rail 124 is preferably secured to an upper cross bar 132a and a lower cross bar 132b of the article supporting portion 112 of the article carrier 114 by clamps or any other suitable means. While two such cross bars 132 are illustrated, it will be appreciated that a lower end 134 of the elongated support rail 124 may just as readily be secured to a lift tube 136 of the article supporting portion 112 if only one cross bar 132 is present. With brief reference to FIG. 11, the elongated support rail 124 includes a plurality of openings 138 formed in a bottom wall 140 thereof for facilitating attachment of the support rail 124 to the cross bars 132. Further, plate 126 is secured to the elongated support rail 124 via suitable fasteners extending through openings 139 (FIG. 12) in the plate 126 and the openings 138 in the support rail 124.

Figure 12:
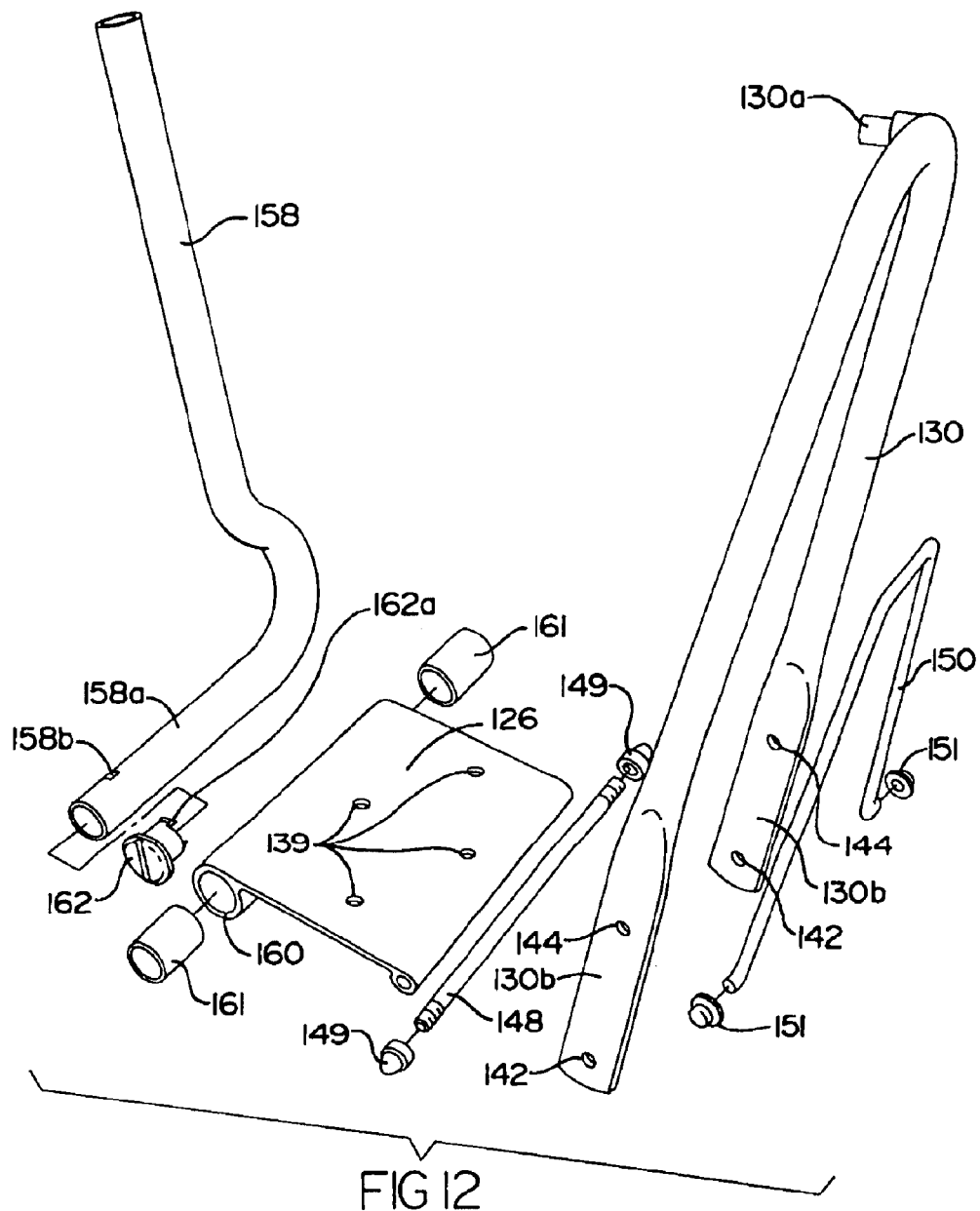
FIG. 12 is an exploded perspective view of a frame engaging assembly of the bicycle carrier of FIG. 9.

With particular reference to FIG. 12, the wheel supporting member 130 forms a generally U-shaped component having a pair of lower ends 130b. The lower ends 130b preferably contain a first set of aligned apertures 142 and a second set of aligned apertures 144 (FIG. 12). The lower ends 130b are secured to a through bore 146 of plate 126 via a pivot pin 148. Specifically, the pivot pin 148 is inserted through the through bore 146 and secured to the supporting member 130 at the first set of aligned apertures 142 by threaded end caps 149.

The wheel supporting member 130 is supported in its extended position (FIGS. 9 and 10) by a support rod 150. The support rod 150 cooperates with the second set of aligned apertures 144 and is secured within the apertures by end caps 151. The support rod 150 is seated within an upper support member 152, the upper support member 152 located on an undersurface 154 of the support rail 124 (FIG. 10). In the extended position the wheel supporting member 130 extends from the support rail 124 at approximately a 90° angle to the support rail 124.

To position the wheel supporting member 130 in the retracted position (FIG. 11), the support rod 150 is removed from engagement with upper support member 152 and rotated about the pivot pin 148 so that it is positioned relatively parallel to the support rail 124. When positioned in the retracted position the support rod 150 is seated within a lower support member 156 located on the undersurface 154 to secure the support rod 150 to the support rail 124.

Figure 11:
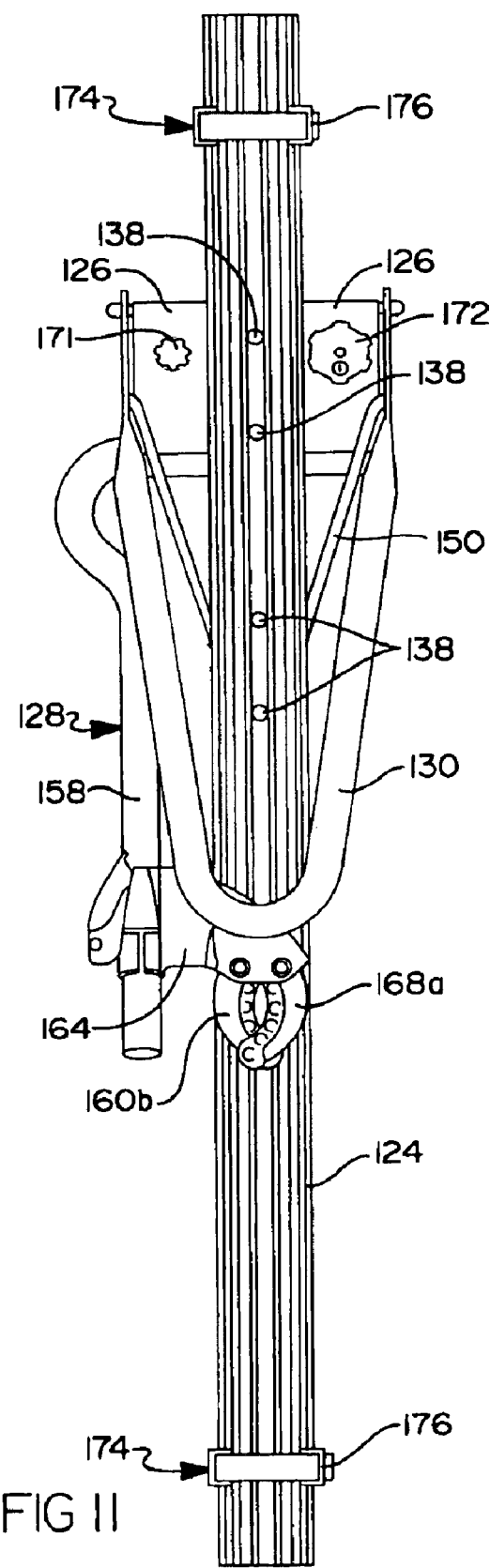
FIG. 11 is a plan view of the bicycle carrier of FIG. 9.

With further reference to FIGS. 10 through 12 the frame supporting assembly 128 can be seen in greater detail. Frame supporting assembly 128 includes a tubular frame supporting element 158 that is pivotally supported from the plate 126 such that the element 158 can be lifted into a position extending outwardly of the support rail 124 (FIGS. 9 and 10) or folded down into a position generally parallel to the support rail 124 (FIGS. 11 and 13). This is facilitated by a lower end 158a (FIG. 12) of the frame supporting element 158 being disposed within a tubular sleeve portion 160 of the plate 126.

Referring further to FIGS. 10 and 12, the frame supporting assembly 128 includes an end cap 162 adapted to be inserted into the lower end 158a (FIG. 12) of the frame supporting element 158 after the lower end 158a is inserted into the tubular sleeve 160 of the plate 126. End cap 162 includes a pair of flexible arm portions 162a (only one being visible) that engage with openings 158b in the lower end portion 158a to thus prevent the element 158 from being pulled out of the sleeve 160 once assembled thereto. To further aid in retaining element 158 within the sleeve 160, the sleeve 160 is outfitted with bushings 161.

Figure 14:
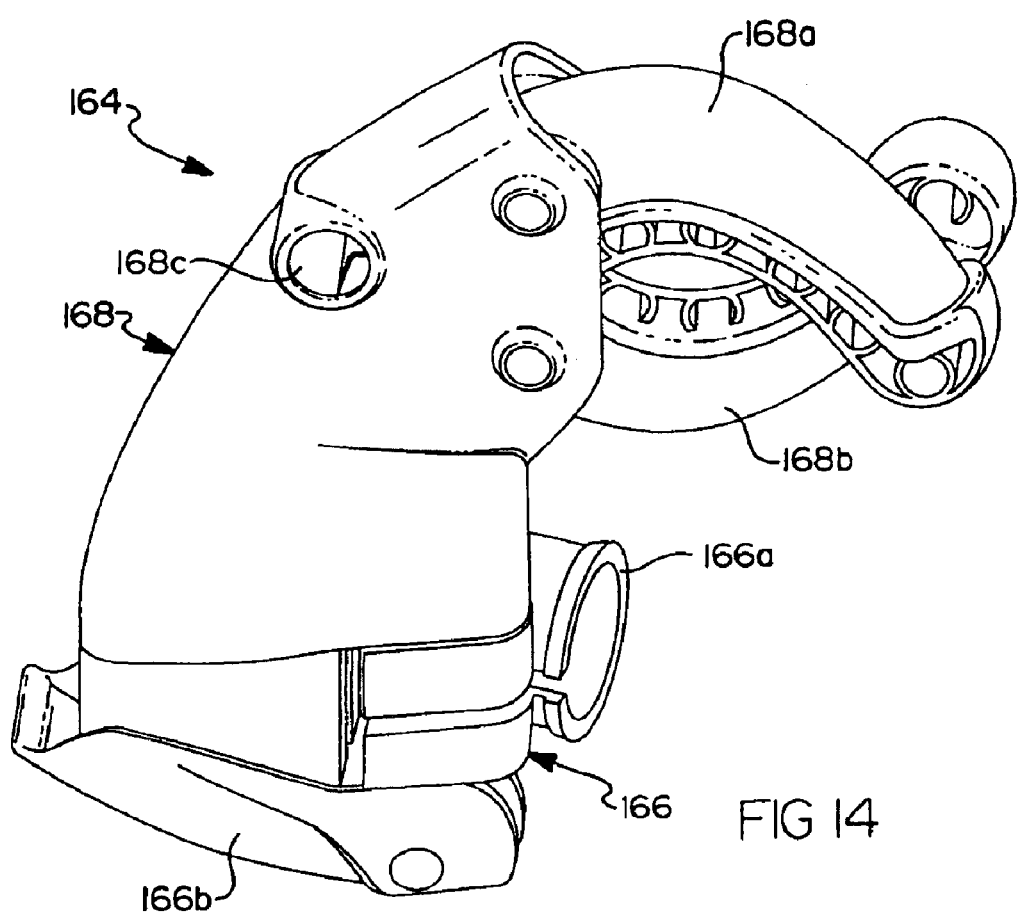
FIG. 14 is a side view of a clamp assembly of the bicycle carrier of FIG. 9.

With reference to FIG. 14, bicycle carrier 110 includes a clamping assembly 164 carried by the frame supporting element 158. The clamp assembly 164 is commercially available from Mont Blanc Industri AB, of Toarpsdal, Sweden. Like clamping assembly 58 of bicycle carrier 10, the clamping assembly 164 is generally comprised of a first clamping subassembly 166 that can be used to adjustably position the clamping assembly 164 along the frame supporting element 158. The first clamping subassembly 166 includes a split collar 166a having a locking lever 166b. The split collar 166a is coupled to a second clamping assembly 168.

The second clamping assembly 168 includes a pair of jaws 168a and 168b. The jaws 168a and 168b are opened and closed by the locking lever 166b. Tightening of the locking lever 166b not only causes the jaws 168a and 168b to be drawn tight around a frame portion 170 of the bicycle 122, but also tightens the split collar 166a on the tubular frame supporting element 158. A lock (not shown) prevents the locking lever 166b from being rotated. The ability to adjustably position the clamping assembly 164 thus allows bicycles of varying sizes to be accommodated on the bicycle carrier 110.

The second clamping assembly 168 also includes a flange 168c. The flange 168c securely receives the locking post 130a when the wheel supporting member 130 is in its folded orientation, shown in FIG. 13b. In this manner, the wheel supporting member 130 and frame supporting assembly 128 can be secured to one another and held in the orientation of FIG. 11 when the bicycle carrier 110 is not in use. This is identical to the construction and operation of the clamping assembly 58 of FIG. 6. In FIG. 13a the locking post 130a is positioned above the flange 168c in preparation for being received by the flange 168c, and in FIG. 13b the locking post 130a is secured within the flange 168c.

For holding the bicycle carrier 110 to one or both of the cross bars 132, a clamp, such as that disclosed in U.S. application Ser. No. 09/865,237, filed May 25, 2001, incorporated by reference herein, may be used. The clamp may be secured to the support rail 124 using any suitable fastening device, such as fastener 171 (FIG. 11). However, it will be appreciated that any other suitable intermediate structure capable of being attached to the cross bars 132 and capable of being secured via suitable external fastening elements to the elongated support rail 124 may be employed. Still further, it is anticipated that the bicycle carrier 110 of the present invention can be supported entirely from the bumper 136, or possibly even from a hitch assembly secured to a frame portion of the vehicle 118 via a suitable intermediate component that engages the hitch and also provides a point of attachment to the elongated support rail 124.

To insure that the bicycle carrier 110 remains secured to the cross bars 132, or any other desired portion of the vehicle 118 or suitable vehicle article carrier 114, the bicycle carrier 110 may be equipped with a locking mechanism 172. The locking mechanism 172 may be any suitable locking mechanism located at any suitable location on the bicycle carrier 110, but is preferably located at the point of attachment between the bicycle carrier 110 and the vehicle 118 or vehicle article carrier 114. As illustrated in FIG. 11, the locking mechanism 172 is located upon the plate 126 and is in the form of a knob that engages any device used to secure the bicycle carrier 110 to the vehicle 118 or vehicle article carrier 114, such as the clamp of U.S. application Ser. No. 09/865,237. When placed in the locked position, the locking mechanism 172 prevents the vehicle article carrier 114 from being removed from the clamp.

FIG. 11 illustrates the bicycle carrier 110 with the wheel supporting member 130 and the frame supporting element 128 in their retracted positions, or folded generally parallel to the elongated support rail 124. It will be appreciated that when the frame supporting element 128 and the wheel supporting member 130 are in the retracted positions, bicycle carrier 110 forms a compact assembly that can be easily maintained on a vehicle.

Referring to FIG. 10, one or more strap assemblies 174 are included to allow the wheels 122a and 122b of the bicycle 122 to be secured positively to the elongated support rail 124. The strap assemblies 174 include a conventional locking assembly 176 for allowing a strap portion 178 thereof to be adjustably tightened over the wheels 122a and 122b. Alternatively, a simple nylon or length of flexible yet strong strapping may be held with a hook and loop style fastener such as a Velcro® hook and loop fastener system, or any other form of suitable fastening means.

Referring further to FIG. 9, in operation the user lifts the bicycle 122 up into the orientation shown in FIG. 9 and places a front wheel 122a thereof in the wheel supporting component 130. The user then orientates the bicycle 122 so that the rear wheel 122b is placed within the elongated support rail 124. Once the front wheel 122a is seated within the wheel supporting component 130, the bicycle 122 is fully supported by the bicycle carrier 110 and no additional support by the user is required. With one hand, the user then lifts up the frame supporting element 158 of the frame supporting assembly 128 and secures the clamp assembly 164 to the frame 170 of the bicycle 122. The clamp assembly 164 is then tightened on the frame supporting element 158 and the straps 174 are tightened over the wheels 122.

Bicycle article carriers 10, 110 of the present invention thus provide a means for enabling a single individual to place and secure a bicycle thereon without the assistance of a second individual, and further without being required to lift the bicycle up onto the roof of a vehicle. Bicycle carrier 110 provides the added advantage of allowing the user to release the bicycle 122 once the front wheel 122a of the bicycle is positioned in the wheel supporting component 130. This allows the user to use both hands to finish securing the rear wheel 122b and the frame 170 to the bicycle carrier 110. The bicycle carriers 10, 110 therefore allow much easier loading and unloading of a bicycle therefrom than many previously developed bicycle carriers. The bicycle carriers 10, 110 further do not require any modifications to an existing vehicle article carrier or to other portions of the vehicle. Still further, the bicycle carriers 10, 110 of the present invention allow the bicycle to be supported at an angle generally normal to the rear liftgate of a vehicle, thus significantly improving visibility through the rear window of the liftgate. It will be appreciated, however, that the bicycle carriers of the present invention may also be used with a horizontally positioned article carrier component.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bicycle carrier adapted to be secured to a horizontal article carrier crossbar adapted to reside over a liftgate on a motor vehicle, to support a bicycle in a vertical orientation adjacent said motor vehicle, said bicycle carrier comprising:

a support structure adapted to be secured to said article carrier crossbar;

a wheel supporting member secured to said support structure so as to project outwardly therefrom generally parallel to a ground surface, for supporting a wheel of a bicycle to thereby support said bicycle in a vertical orientation therefrom adjacent said motor vehicle; and a frame engaging assembly operably associated with said support structure for engaging a portion of a frame of said bicycle when said bicycle is suspended in said vertical orientation, said frame engaging assembly including:

a frame supporting member; and a mounting late fixedly secured to said support structure, said frame supporting member being pivotaly secured to said mounting plate to allow a degree of adjustability to accommodate bicycle frames of various sizes.

2. The bicycle carrier of claim 1, wherein said wheel supporting member forms a U-shaped member that is pivotally secured to said support structure and movable from a stowed position, wherein it rests substantially adjacent said support structure, to an operable position projecting generally horizontally from said support structure.

3. The bicycle carrier of claim 1, further comprising an elongated support rail operably secured to said support structure for engaging a wheel of said bicycle when said bicycle is suspended from said wheel supporting member.

4. The bicycle carrier of claim 1, further comprising a securing strap associated with said elongated support rail for securing said wheel engaged with said elongated support rail to said elongated support rail.

5. A bicycle carrier adapted to be secured to an article carrier crossbar adapted to reside over a liftgate on a motor vehicle, to support a bicycle in a vertical orientation adjacent said motor vehicle, said bicycle carrier comprising:

a support structure adapted to be secured to said article carrier crossbar;

a wheel supporting member pivotally secured to said support structure and pivotally movable between a stowed position, wherein said wheel supporting member is disposed substantially parallel to said support structure, and an operable position wherein said wheel supporting member projects outwardly from said support structure and receives a wheel of a bicycle to thereby support said bicycle in a vertical orientation therefrom; and a frame engaging assembly operably associated with said support structure for engaging a portion of a frame of said bicycle when said bicycle is suspended in said vertical orientation, said frame engaging assembly comprising:

a support arm;

a clamp carried by said support arm, said clamp being adapted to engage said frame of said bicycle; and a support member for securing said support arm to said support structure.

6. The bicycle carrier of claim 5, further comprising an elongated support rail operably secured to said support structure for engaging a wheel of said bicycle that is not engaged with said wheel supporting member, to further support said bicycle in said vertical orientation.

7. A bicycle carrier adapted to be secured to an article carrier crossbar adapted to reside over a liftgate on a motor vehicle, to support a bicycle in a vertical orientation adjacent said motor vehicle, said bicycle carrier comprising:

an elongated support rail adapted to be fixedly secured to said article carrier crossbar such that said support rail extends in a generally vertical orientation adjacent said motor vehicle;

a foldable wheel support operably associated with said support rail for engaging a wheel of said bicycle and substantially supporting said bicycle; and a frame engaging assembly operably associated with said support rail for engaging a frame portion of said bicycle and holding said bicycle against said support rail, said frame engaging assembly comprising:

a frame supporting member operably secured to said elongated support rail and movable pivotally relative to said elongated support rail; and a clamping assembly adjustably postionable along said frame supporting member for engaging a portion of a frame of said bicycle.

8. The bicycle carrier of claim 7, wherein said foldable wheel support comprises a U-shaped component adapted to engage a portion of a wheel of said bicycle.

9. The bicycle carrier of claim 7, wherein said foldable wheel support includes:

a wheel supporting component moveable pivotally relative to said support rail and adapted to engage a portion of a wheel of said bicycle;

a mounting component, said mounting component adapted to be fixedly secured to said support rail;

wherein said foldable support wheel is pivotably coupled to said mounting component; and wherein said mounting component includes a stop portion for limiting pivotal movement of said wheel supporting component.

10. The bicycle carrier of claim 7, wherein said frame engaging assembly includes:

a mounting plate fixedly secured to said elongated support rail, said frame supporting member being pivotally secured to said mounting plate to allow a degree of adjustability to accommodate bicycle frames of various sizes.

11. The bicycle carrier of claim 7, wherein said frame engaging assembly includes a clamp assembly for clamping onto a portion of a frame of said bicycle.

12. The bicycle carrier of claim 7, further comprising:
a mounting plate fixedly secured to said elongated support rail, said foldable wheel support and said frame engaging assembly being pivotally secured to said mounting plate.

13. The bicycle carrier of claim 7, wherein said bicycle comprises a first wheel and a second wheel, said first wheel seated within said wheel support such that said first wheel is supported at a point on said elongated support rail above said second wheel.

14. A bicycle carrier adapted to be secured to an article carrier crossbar adapted to reside over a liftgate on a motor vehicle, to support a bicycle in a vertical orientation adjacent said liftgate of said motor vehicle, said bicycle carrier comprising:
an elongated support rail adapted to be fixedly secured to said article carrier crossbar such that said support rail extends in a generally vertical orientation and is spaced apart from said liftgate of said motor vehicle;
a foldable wheel support adapted to be extended into an operative position extending outwardly of said support rail for engaging one wheel of said bicycle and substantially supporting said bicycle when said bicycle is lifted and placed with said one wheel on said foldable wheel support in a generally vertical orientation; and
a secondary support assembly for engaging said bicycle at a position other than said one wheel to further assist in securing said bicycle in said vertical orientation, said secondary support assembly comprising:
a support arm;
a clamp carried by said support arm, said clamp being adapted to engage a frame portion of said bicycle; and
a support member for securing said support arm to said elongated support rail.

15. The bicycle carrier of claim 14, wherein said support arm is pivotally secured to said support member.

16. The bicycle carrier of claim 14, wherein said foldable wheel support comprises:
a generally U-shaped member adapted to engage a portion of said one wheel of said bicycle; and
a support device secured to said support rail; and
wherein said U-shaped member is pivotally secured to said support device so as to be foldable into a position extending generally parallel to said support rail, and extending into a position extending generally normal to said support rail.

17. The bicycle carrier of claim 14, wherein said elongated support rail forms a generally V-shaped well.

18. The bicycle carrier of claim 14, wherein said support arm is foldable to a position generally parallel to said elongated support rail when not in use.

19. The bicycle carrier of claim 14, further comprising:
wherein said foldable wheel support and said frame engaging assembly are pivotally secured to said support member.

20. The bicycle carrier of claim 14, wherein said bicycle comprises a first wheel and a second wheel, said first wheel seated within said wheel support such that said first wheel is supported at a point on said elongated support rail above said second wheel.

21. A bicycle carrier adapted to be secured to an article carrier crossbar adapted to reside over a liftgate on a motor vehicle to support a bicycle in a vertical orientation adjacent a liftgate of said motor vehicle, said bicycle carrier comprising:
an elongated support rail adapted to be fixedly secured to said article carrier crossbar such that said support rail extends in a generally vertical orientation and is spaced over but apart from said liftgate of said motor vehicle;
a foldable wheel support adapted to be extended between a stored position, wherein said foldable wheel support is disposed generally parallel to said elongated support rail and an operative position wherein said foldable wheel is extended into a position outwardly of said support rail;
wherein said foldable wheel support engages one wheel of said bicycle and substantially supports an entire weight of said bicycle when said bicycle is positioned with said one wheel on said foldable wheel support in a generally vertical orientation; and
a secondary support assembly secured to said elongated support member for engaging said bicycle at a position other than said one wheel to further assist in securing said bicycle in said vertical orientation, said second support assembly comprising:
a frame supporting member operably secured to said elongated support rail and movable pivotally relative to said elongated support rail; and
a clamping assembly adjustably postionable along said frame supporting member for engaging a portion of a frame of said bicycle.

22. The bicycle carrier of claim 21, wherein said bicycle comprises a first wheel and a second wheel, said first wheel seated within said wheel support such that said first wheel is supported at a point on said elongated support rail above said second wheel.

23. A bicycle carrier adapted to be secured to an article carrier crossbar adapted to reside over a liftgate on a motor vehicle, to support a bicycle in a vertical orientation adjacent a generally vertical wall portion of said vehicle, said bicycle carrier comprising:
a main support member adapted to be fixedly secured to said article carrier crossbar such that said main support extends in a generally vertical orientation and is spaced over but apart from said liftgate of said motor vehicle;
a foldable wheel support adapted to be extended between a stored position, wherein said foldable wheel support is disposed generally parallel to said main support member, and an operative position wherein said foldable wheel is extended into an position outwardly of said main support member;
wherein said foldable wheel support engages one wheel of said bicycle and substantially supports an entire weight of said bicycle when said bicycle is positioned with said one wheel on said foldable wheel support in a generally vertical orientation; and
a secondary support assembly operably associated with said main support member for engaging a frame portion of said bicycle to further assist in holding said bicycle against said main support member and in said generally vertical orientation, said secondary support assembly comprising:
a frame supporting member operably secured to said main support member and movable pivotally relative to said main support member; and
a clamping assembly adjustably postionable along said frame supporting member for engaging a portion of a frame of said bicycle.

24. The bicycle carrier of claim 23, wherein said main support member comprises an elongated support rail forming a channel.

25. The bicycle carrier of claim 23, wherein said frame supporting member is postionable generally parallel to said main support member when said bicycle carrier is not in use.

26. The bicycle carrier of claim 23, wherein said clamping assembly is adjustably postionable on said frame supporting member.

27. The bicycle carrier of claim 23, further comprising:
a mounting plate fixedly secured to said main support member, said foldable wheel support and said frame supporting member being pivotally secured to said mounting plate.

28. The bicycle carrier of claim 23, wherein said bicycle comprises a first wheel and a second wheel, said first wheel seated within said wheel support such that said first wheel is supported at a point on said main support member above said second wheel.

29. A bicycle carrier adapted to be secured to an article carrier structure on a motor vehicle, to support a bicycle in a vertical orientation adjacent said motor vehicle, said bicycle carrier comprising:
an elongated support rail adapted to be fixedly secured to said article carrier structure such that said support rail extends in a generally vertical orientation adjacent said motor vehicle;
a foldable wheel support adapted to be extended into an operative position extending outwardly of said support rail for engaging a wheel of said bicycle and substantially supporting an entire weight of said bicycle in a substantially vertical orientation; and
a frame engaging assembly operably associated with said support rail for engaging a frame portion of said bicycle and holding said bicycle against said support rail, said frame engaging assembly including:
a frame supporting member; and
a mounting plate fixedly secured to said elongated support rail, said frame supporting member being pivotally secured to said mounting plate to allow a degree of adjustability to accommodate bicycle frames of various sizes.

30. A bicycle carrier adapted to be secured to an article carrier structure on a motor vehicle, to support a bicycle in a vertical orientation adjacent a lift gate of said motor vehicle, said bicycle carrier comprising:
an elongated support rail adapted to be fixedly secured to said article carrier structure such that said support rail extends in a generally vertical orientation and spaced apart from said liftgate of said motor vehicle;
a foldable wheel support adapted to be extended into an operative position extending outwardly of said support rail for engaging one wheel of said bicycle and substantially supporting an entire weight of said bicycle in a substantially vertical orientation when said bicycle is lifted and placed with said one wheel on said foldable wheel support; and
a secondary support assembly for engaging said bicycle at a position other than said one wheel to further assist in securing said bicycle in said vertical orientation, said secondary support assembly comprising:
a tube;
a clamp carried by said tube, said clamp being adapted to engage a frame portion of said bicycle; and
a support member for securing said tube to said elongated support rail.

31. The bicycle carrier of claim 30, wherein said tube is pivotally secured to said support member.

32. The bicycle carrier of claim 30, wherein said tube is foldable to a position generally parallel to said elongated support rail when not in use.

33. A bicycle carrier adapted to be secured to an article carrier structure on a motor vehicle, to support a bicycle in a vertical orientation adjacent a lift gate of said motor vehicle, said bicycle carrier comprising:
an elongated support rail adapted to be fixedly secured to said article carrier structure such that said support rail extends in a generally vertical orientation and spaced over but apart from said liftgate of said motor vehicle;
a foldable wheel support adapted to be extended between a stored position, wherein said foldable wheel support is disposed generally parallel to said elongated support rail, and an operative position wherein said foldable wheel is extended into a position outwardly of said support rail;
said foldable wheel support engaging one wheel of said bicycle and substantially supporting an entire weight of said bicycle when said bicycle is lifted and placed with said one wheel on said foldable wheel support in a generally vertical orientation; and
a secondary support assembly secured to said elongated support member for engaging said bicycle at a position other than said one wheel to further assist in securing said bicycle in said vertical orientation, said secondary support assembly comprising:
a frame supporting member operably secured to said elongated support rail and moveable pivotally relative to said elongated support rail; and
a clamping assembly adjustably postionable along said frame supporting member for engaging a portion of a frame of said bicycle.

* * * * *